(12) United States Patent
Minniti

(10) Patent No.: US 7,065,819 B1
(45) Date of Patent: Jun. 27, 2006

(54) UNIVERSAL HORSE FARRIER TOOL

(75) Inventor: Robert Minniti, Columbiana, OH (US)

(73) Assignee: Trailsmith, Ltd., Canfield, OH (US)

( * ) Notice: Subject to any disclaimer, the term of this patent is extended or adjusted under 35 U.S.C. 154(b) by 0 days.

(21) Appl. No.: 10/986,727

(22) Filed: Nov. 12, 2004

(51) Int. Cl.
*B25B 7/22* (2006.01)

(52) U.S. Cl. .............................. 7/137; 7/128

(58) Field of Classification Search ............ 7/125, 7/127, 129, 130, 132, 139, 144, 158, 161, 7/167
See application file for complete search history.

(56) References Cited

U.S. PATENT DOCUMENTS

| | | | | |
|---|---|---|---|---|
| 95,793 A | * | 10/1869 | Granier | 7/131 |
| 114,759 A | * | 5/1871 | Capewell | 7/127 |
| 243,653 A | * | 6/1881 | Straszer | 7/130 |
| 245,398 A | * | 8/1881 | Phillips | 7/130 |
| 568,242 A | * | 9/1896 | Fay | 30/193 |
| 1,113,844 A | * | 10/1914 | Smith | 81/165 |
| 2,608,891 A | * | 9/1952 | Haussler | 7/129 |
| 3,094,020 A | * | 6/1963 | Wise | 81/13 |
| 4,614,001 A | | 9/1986 | Liou | |
| 4,696,346 A | | 9/1987 | Ryan | |
| D349,636 S | * | 8/1994 | White et al. | D8/52 |
| 5,575,029 A | | 11/1996 | Simpson | |
| 5,987,752 A | | 11/1999 | Swanstrom, Jr. | |
| 6,493,892 B1 | | 12/2002 | Kang | |
| 6,591,917 B1 | | 7/2003 | Clough et al. | |

* cited by examiner

*Primary Examiner*—David B. Thomas
*Assistant Examiner*—Robert Scruggs
(74) *Attorney, Agent, or Firm*—Harpman & Harpman

(57) ABSTRACT

A multi-purpose combination hand tool useful for maintaining and attachment of horse shoes has two pivotally interengagement jaw members that define a number of user specific tool elements therebetween in a single tool configuration. The hand tool can be used as a shoe puller, nipping tool, nail clincher and nail puller as well as a hammer and hoof pick.

12 Claims, 6 Drawing Sheets

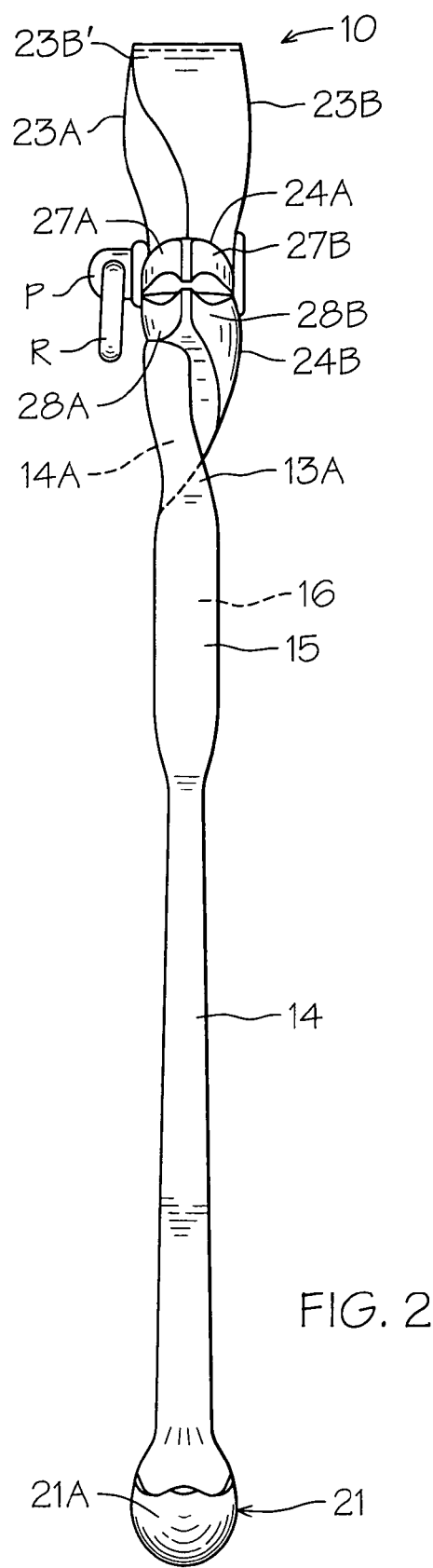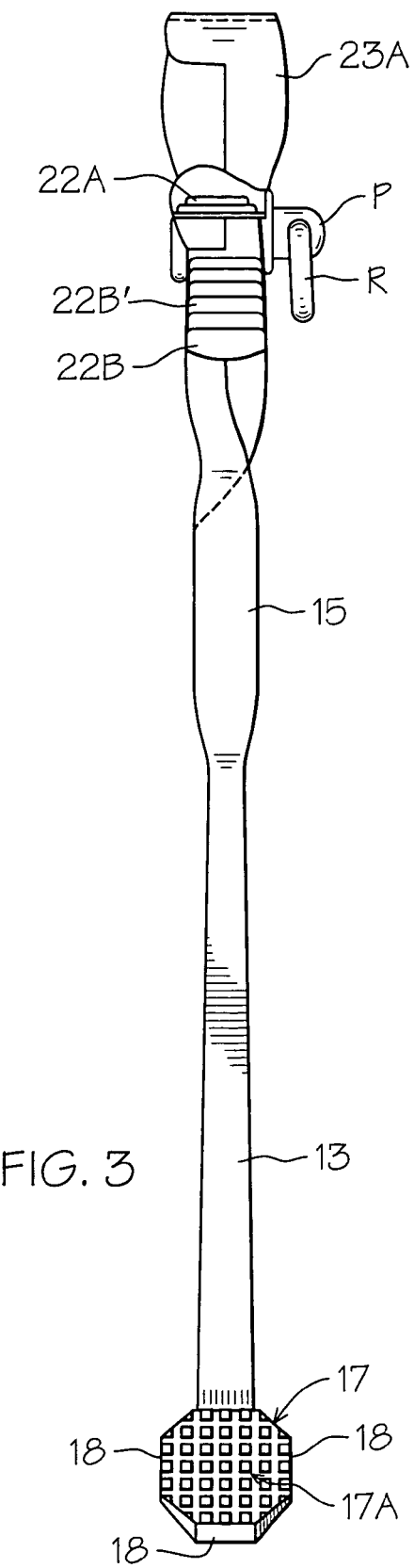
FIG. 2
FIG. 3

UNIVERSAL HORSE FARRIER TOOL

BACKGROUND OF THE INVENTION

1. Field of he Invention

This invention relates to hand tools useful in horse shoeing and more specifically to multi-functional adjustable hand tools having a variety of tool use configurations.

2. Description of Prior Art

Prior art devices of this type have been developed having single and multiple tools in a hand tool configuration, see for example U.S. Pat. Nos. 4,614,001, 4,696,346, 5,575,020, 5,987,752, 6,493,892, 6,591,917, and D349,636.

In U.S. Pat. No. 4,614,001 a multi-purpose plier tool is disclosed having pairs of opposing jaw elements and integrated hammer head extending therefrom.

U.S. Pat. No. 4,696,346 discloses a farrier's tool with a multi-functional element. A tri-pivot opposing jaw allows for a variety of different jaw engagement uses.

U.S. Pat. No. 5,575,029 illustrates a combination hand tool with a pair of opposing pivot jaws defining a claw hammer, a wire stripper, plier gripper jaws and a pipe reamer.

The farrier's nippers tool can be seen in U.S. Pat. No. 5,987,752 in which a pair of pivoted opposing jaws and associated handles are disclosed with a nippers jaw defined therebetween.

U.S. Pat. No. 6,493,892 claims a multi-purpose tool having pivoted handle portions with a nail holder and setter and plier jaw configurations formed thereby.

U.S. Pat. No. 6,591,971 discloses a horse farrier tool with a first and second plier levers pivoted together having a pair of wedge shaped upper jaw portions extending therefrom.

Design Patent D349,636 illustrates an ornamental design for a horse shoer's nipper tool having dual pivots on each lever jaw portion to presumably provide for enhanced force application to the opposing nipper jaws incorporated therewith.

SUMMARY OF THE INVENTION

A single hand tool able to perform multiple tool functions associated with horse shoeing and related tasks by a horse farrier. The tool incorporates multiple tool elements into a pair of pivoting multi-jawed and plier handle lever configuration. Each of the jaw elements have multiple distinctive opposing engagement portions with the associated handle levers having additional functional application elements extending therefrom.

DESCRIPTION OF THE DRAWINGS

FIG. 2 is a right side elevational view thereof;

FIG. 3 is a left side elevational view thereof;

DETAILED DESCRIPTION OF THE INVENTION

Figure 1:
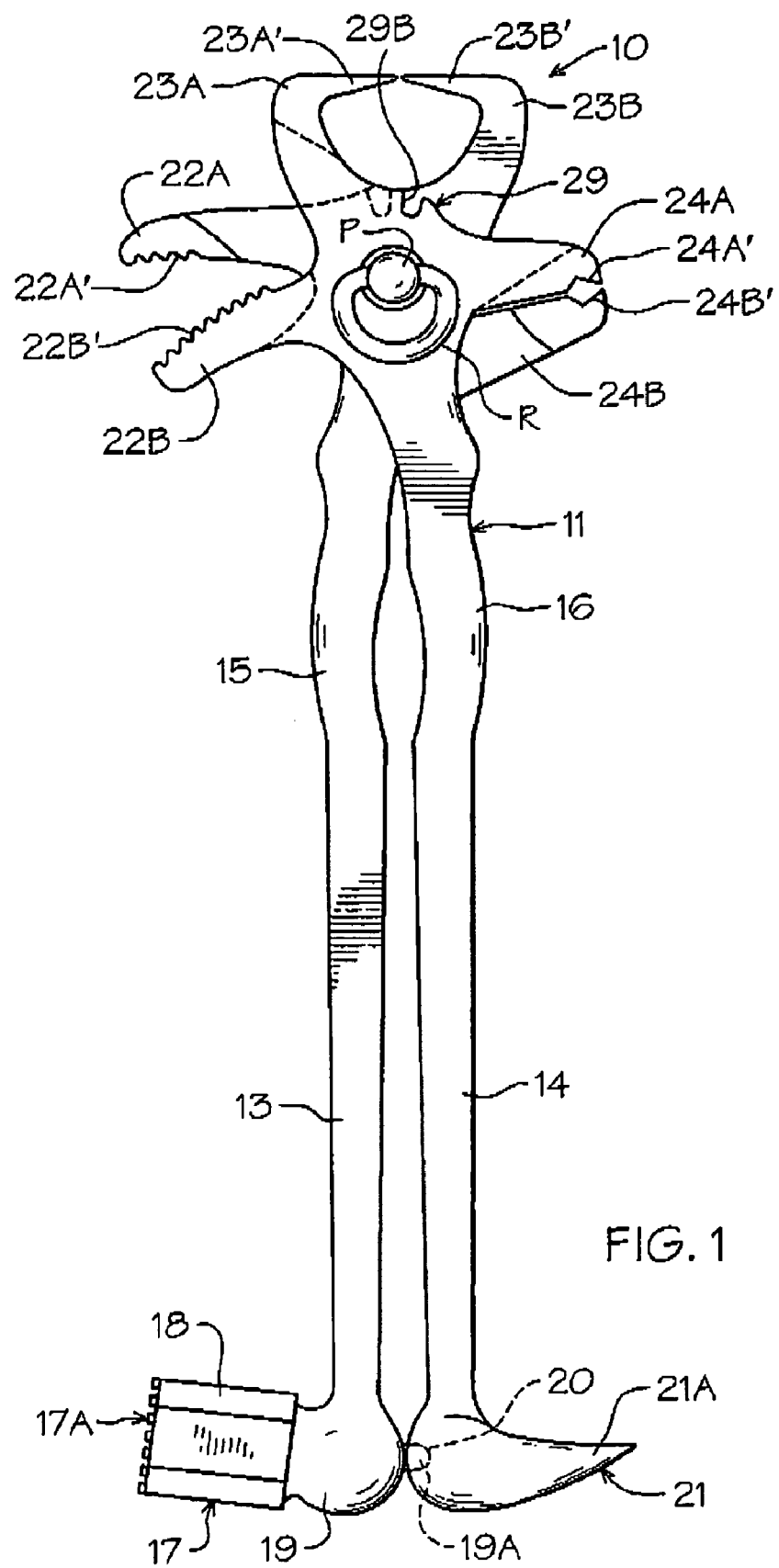
FIG. 1 is a front elevational view of the primary form of the invention.

Referring to FIGS. 1–5 of the drawings, a multi-purpose tool 10 can be seen having a first handle and jaw member 11 joined by a pivot pin P fitting with a second handle and jaw member 12. The lower portion of each handle and jaw member's 11 and 12 form handles 13 and 14 respectively. Each of the handles 13 and 14 are transversely offset at 13A and 14A for opposing alignment with one another with respective longitudinal bow portions 15 and 16 formed therein in spaced relation thereafter. The handle 13 has a hammer head 17 formed on its free end having a knurled face 17A and a plurality of opposing flat side surface pairs 18 extending thereabout. In the preferred embodiment, the hammer head 17 extends from an enlarged contoured end portion 19 of the handle 13. A stabilization and alignment pin 19A projects from the end portion 19 for registration within a corresponding recessed 20 in the free end of the opposing handle 14. A hoof pick fitting 21 comprising of a conical projection 21A is formed on the handle 14's free end and extends in oppositely disposed relation to the hereinbefore described recess 20, best seen in FIG. 1 of the drawings. The pick fitting 21 can be used for a variety of functions required in the horse farrier trade as will be well known to those skilled in the art.

Referring now to the upper portion of the first and second handle jaw members 11 and 12, each have respective multiple jaw elements 22A and 22B, 23A and 23B and 24A and 24B respectively thereon which are correspondingly aligned so as to be movably engaged towards and away from one another defining respective pivot jaw pairs 22, 23 and 24. The respective jaw elements 22A and 22B extend at right angles from the respective handle and jaw members 11 and 12 and have a plurality of transverse raised longitudinally spaced engagement ribs 22A' and 22B' thereon and are in spaced relation to one another when in so-called "closed" position as illustrated in FIG. 1.

The jaw elements 22A and 22B thus defined are referred in the farrier's art as "nail cinchers" and "nail bender".

Figure 4:
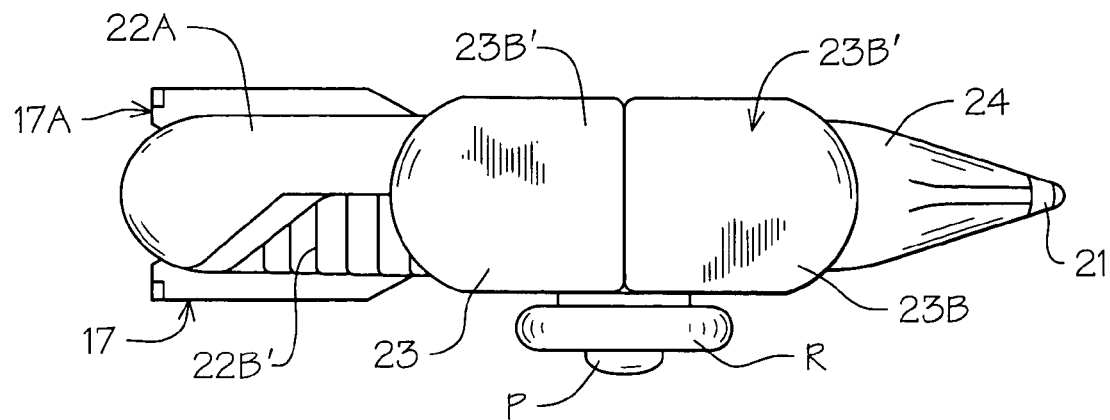
FIG. 4 is a top plan view on lines 4—4 of FIG. 1.
Figure 5:
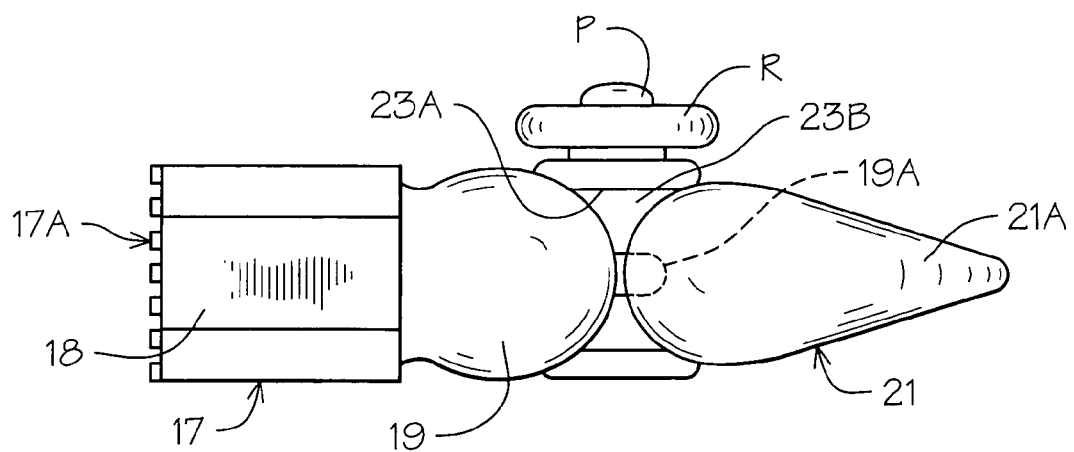
FIG. 5 is a bottom plan view on lines 5—5 of FIG. 1.

The jaw pair elements 23A and 23B which extend on the longitudinal axial plane of the respective handle portions 13 and 14 define respective transversely flat tapered chisel engagement surfaces 23A' and 23B' to form an edge to edge registration defining a classic so-called "nipper" tool and alternately so called "shoe puller" tool configuration well known and understood within the art and is best seen in FIGS. 1 and 4 of the drawings.

The final jaw pair elements 24A and 24B extend at right angles from the respective handle jaw members 11 and 12 in oppositely disposed spaced relation to the hereinbefore described jaw pair 22. Each of the jaw elements 24A and 24B have a transverse V-shaped notch therein at 24A' and 24B' inwardly of the respective free ends with opposing registration alignment of their vertical sidewall surfaces 27A and 27B and 28A and 28B which are tapered inwardly, best seen in FIG. 2 of the drawings. The jaw pair 24 as so defined is referred to in the art as a so called "nail puller" and also is used as a so called "pincher pliers" due to the tapered beak like configuration of the respective opposing and engageable jaw elements 24A and 24B.

Referring back to FIG. 1 of the drawings, a "cutter portion" 29 of the tool is configured between the respective jaw elements 23A, 24A and 23B and 24B by formation of notches at 29A and 29B therein shown in dotted and solid lines which allows for elongated "wire like" material (not shown) to be inserted when the notches 28A and 28B are so aligned and cut by applied force to the hereinbefore described handle portions 13 and 14.

It will be evident to those skilled in the farrier art that the selective use of the multiple tool configurations as illustrated by the jaw pairs 22, 23 and 24 are that of individual tools of the same design and wherein improvements have been made which will serve to enhance the functionality of the multipurpose tool 10 of the invention.

Figure 6:
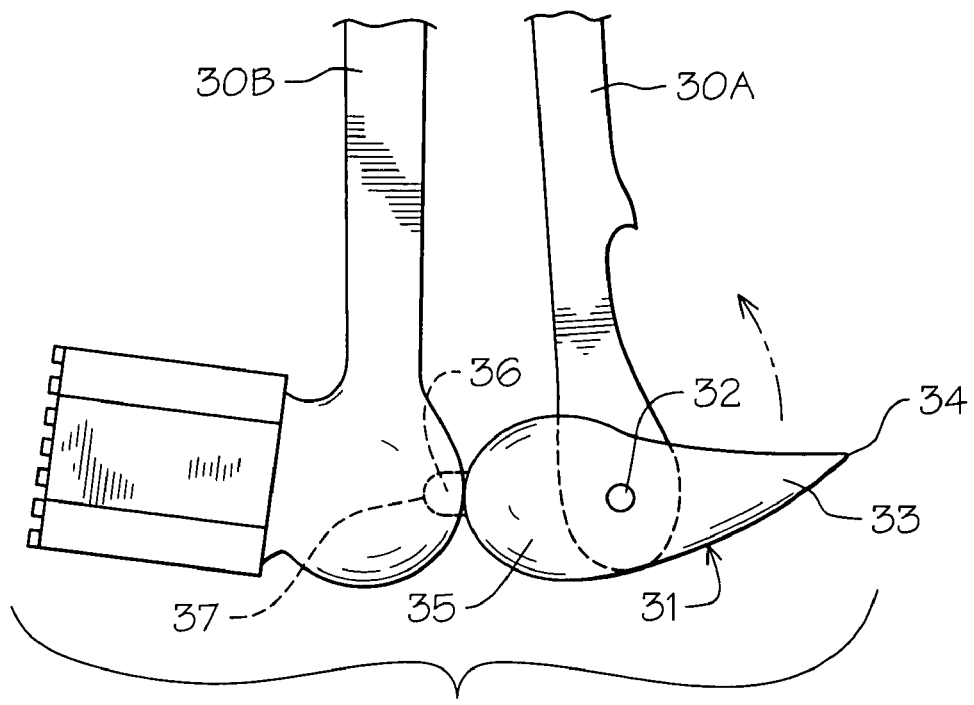
FIG. 6 is a front elevational view of a first alternate form of the invention.
Figure 7:
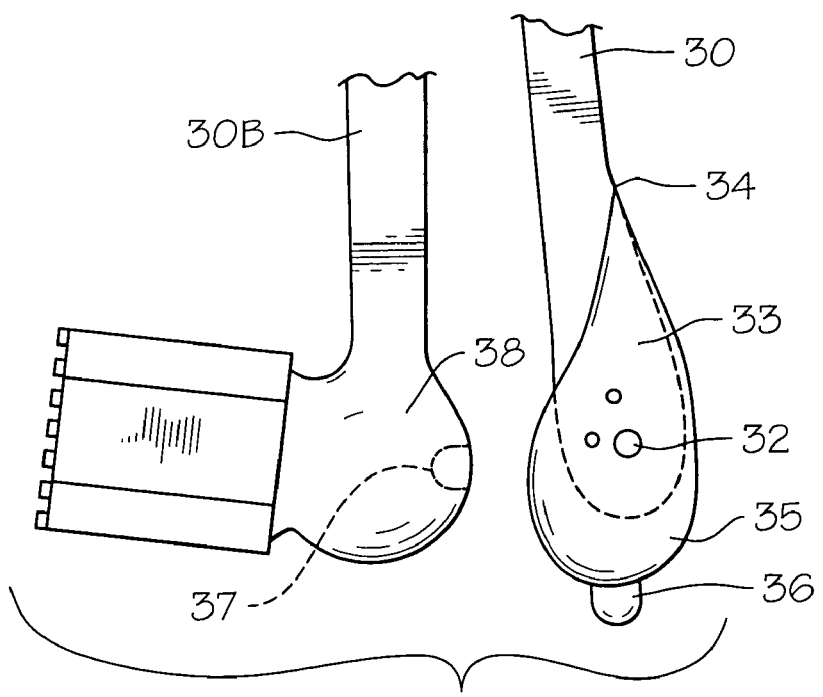
FIG. 7 is a front elevational view of a second alternate form of the invention illustrated in open and close position.

Referring now to FIGS. 6 and 7 of the drawings, a first alternate form of the invention can be seen wherein modified handle portions 30A and 30B are illustrated in which the free end of the portion 30A is rounded off and a contoured U-shaped channel element 31 is pivotally secured thereover at 32 having respective tapered sidewalls 33 extending to a tapered end point at 34. A rounded contoured attachment end walls 35 can be seen in oppositely disposed relation to the tapered end point 34 having a stabilization lug 36 extending therefrom for registration within a corresponding recessed area 37 in the end of the opposing handle portion 38. It will be seen that by pivoting the element 31 to a non-engagement portion illustrated in FIG. 7 of the drawings along the longitudinal axis of the handle 30 the user can apply additional force to hereinbefore described multiple jaw configurations by compression of the handle portions 30A and 30B towards one another. This, in effect, will provide a so called "over torqueing" of the jaws which may be required in some applications.

Figure 8:
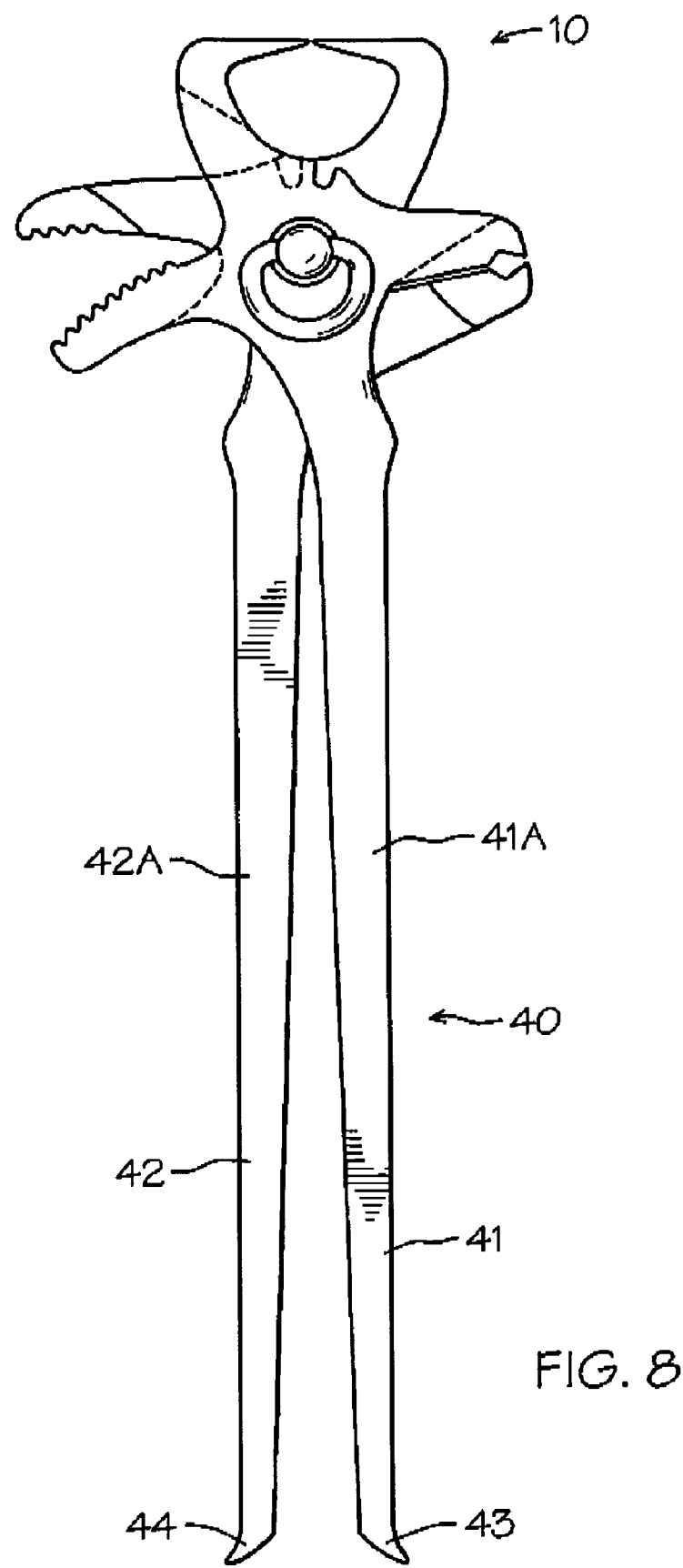
FIG. 8 is a front elevational view of a third alternate form of the invention illustrating a universal handy man's tool.

Referring now to FIG. 8 of the drawings, an alternate handle portion 40 can be seen for the primary form of the invention in which the handles 13 and 14 have been modified as alternate handle portions 41 and 42 having longitudinally extending generally straight shafts 41A and 42A and corresponding curvilinear ends at 43 and 44.

Figures 9, 10:
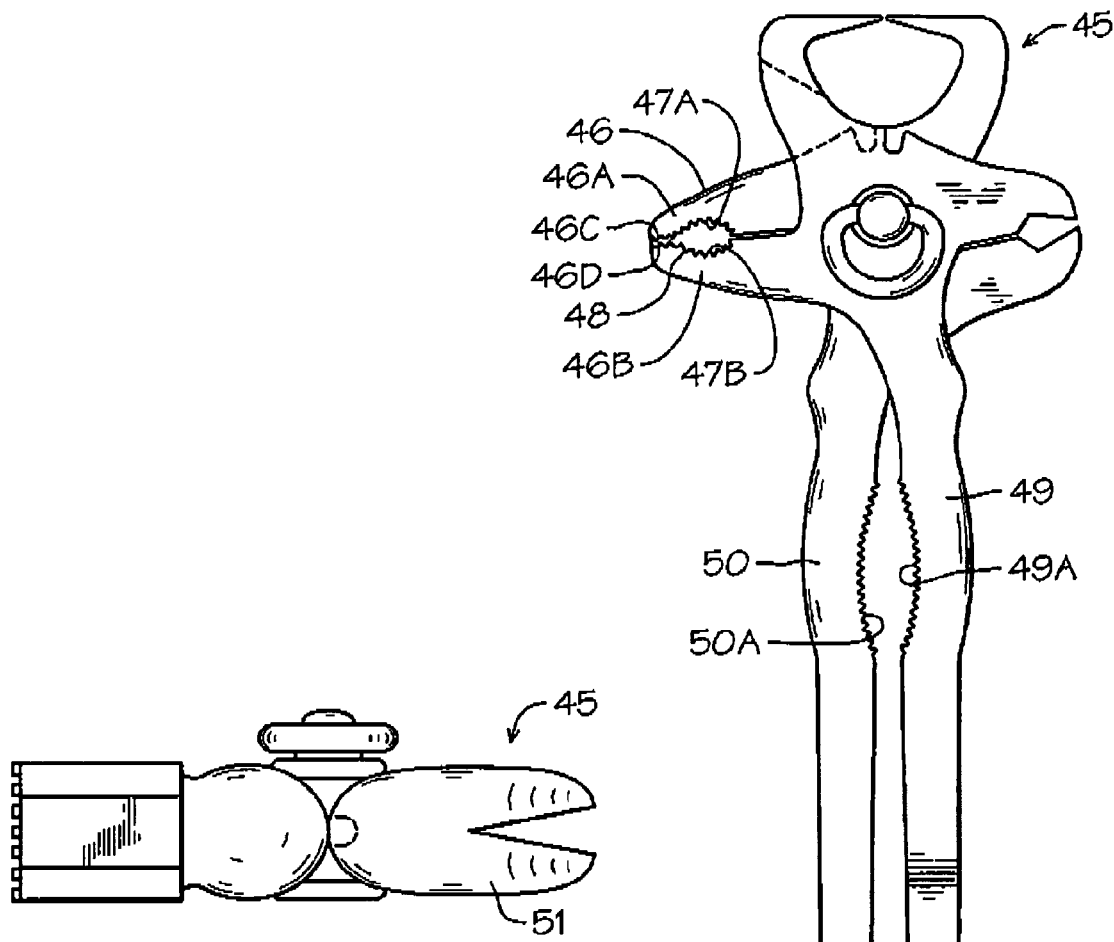
FIG. 9 is a bottom plan view thereof.
FIG. 10 is a front elevational view of a fourth alternate form of the invention.

Referring now to FIGS. 9 and 10 of the drawings, a third alternate form of the invention can be seen as a universal handy man's tool 45. The tool 45 is a modified form of the invention in which the original jaw pairs 22 have been modified as jaw pair 46 having a more typical hand plier jaw shapes 46A and 46B in which the opposing flat engagement surfaces 46C and 46D interengaged when in closed position. The jaws 46A and 46B have opposing concave curve sources 47A and 47B with corresponding teeth 48.

Additionally, it will be seen that the longitudinal bow portions 15 and 16 have been modified at 49 and 50 to have a plurality of aligned longitudinal spaced teeth 49A and 50A.

As best seen in FIG. 9 of the drawings, a modified form of the hoof pick 21 of the primary form of the invention can be seen as a bifurcated claw 51 which will emulate the form and function of a well known claw hammer, (claw not shown) and can be used for removing nails and other associated tasks.

It will be evident that these modifications in combination with the modified jaw pair 41 allow the alternate form of the tool 45 to be used in a wide range of uses not necessarily associated with the farrier's art.

It will thus be seen that a new and useful multiple jaw and functionality tool has been illustrated and described that encompass both the applications of the farrier art as well as every day use by providing a complex hand tool with multi-functional featured jaw configurations and handle elements associated therewith.

Having thus described my invention it will be apparent to those skilled in the art that various changes and modifications may be made therein without departing from the spirit of the invention.

I claim:

1. A multi-functional adjustable hand tool useful in attaching and maintaining shoes to horses comprising, a first handle jaw member of integral monolithic construction having a handle portion and multiple fixed jaw members, a second handle jaw member having a handle portion and multiple fixed jaw members, said first and second handle jaw members being pivotally secured to one another whereby said handle portions and said multiple jaw portions are in effacing orientation alignment, pairs of said effacing fixed jaw members in oppositely disposed relation to one another in right angular orientation to the longitudinal axis of said handle portions, said effacing fixed jaw members pairs comprising transverse V-shaped notches in said respective jaw elements and tapered side wall surfaces, said remaining disposed effacing fixed law members comprising jaw portions haying transverse engaging ribs thereon said handle portions having a striking element and conical projection extending respectively from the free ends thereof which are in selective engagement with each other with a stabilization alignment pin registerable with said respective handle end extending therebetween.

2. The multi-functional adjustable hand tool set forth in claim 1 wherein said first and second handle portions have oppositely disposed parallel elongated bow portions in spaced adjacent relation to said respective multiple jaw portions.

3. The multi-functional adjustable hand tool set forth in claim 1 wherein said striking element comprises a hammer head.

4. The multi-functional adjustable hand tool set forth in claim 1 wherein said stabilization and alignment pin is removable within a recess fitting in said respective handle portions.

5. The multi-functional adjustable hand tool set forth in claim 1 wherein a pair of effacing fixed jaw portions in longitudinal alignment with opposite handle portions comprises, transversely flat tapered jaw engagement surfaces defining a "nipper" tool.

6. The multi-functional adjustable hand tool set forth in claim 1 wherein a pair of cutter notches are formed in respective jaw pairs in longitudinal alignment with said respective handle portions, said cutter notches selectively aligned from a first position during movement of said independent handle portions for receiving material to be cut therein to a second non-aligned position in side by side relation.

7. A multi-functional adjustable hand tool set forth in claim 1 wherein said first and second fixed multiple jaw portions define movable corresponding jaw pairs of like configurations in response to pivoting movement of said respective handle portions towards and away from one another.

8. The multi-functional adjustable hand tool set forth in claim 1 wherein said conical projection comprises, a channel element pivotally secured to said respective handle portion inwardly from its free end, said channel element having a closed tapered end and a rounded closed end, said channel element movable from a first position in longitudinal alignment with said handle to a second position in transverse alignment thereto and registerable with said remaining opposing handle element.

9. A multiple functional adjustable hand tool comprising, a first and second handle jaw members of integral monolithic construction having respective handle extension elements and multiple fixed jaw portions, said first and second handle jaw members being pivotally secured to one another whereby said multiple jaw portions and said handle portions pairs are in effacing orientation to one another, said handle portions having opposing bow portions, each with a plurality of transverse teeth therein, a striking element and a bifurcated projection extending from their respective free ends in oppositely disposed relation to one another a pin extending from said striking element handle portion registerable within a receiving recess in said remaining handle portion.

10. The multi-functional adjustable hand tool set forth in claim 9 wherein two of said pairs of effacing jaws are in oppositely disposed relation to one another and wherein said respective jaw portions of one of said jaw pairs are registerable against one another having transverse V-shaped notches in said respective jaw portions.

11. The multi-functional adjustable hand tool set forth in claim 9 wherein one pair of effacing jaw portions in longitudinal alignment with said handle portion comprises, transversely flat and tapered engagement surfaces of a "nipper tool" configuration.

12. The multi-functional adjustable hand tool set forth in claim 9 wherein a pair of cutter notches are formed in one of said jaw pairs in longitudinal alignment with said respective handle portions, said cutter notches selectively aligned during movement of said independent handle portions for receiving material to be cut therein.

* * * * *